(12) United States Patent
Ishimaru

(10) Patent No.: US 12,158,417 B1
(45) Date of Patent: Dec. 3, 2024

(54) SPECTROMETRY DEVICE

(71) Applicant: NATIONAL UNIVERSITY CORPORATION KAGAWA UNIVERSITY, Takamatsu (JP)

(72) Inventor: Ichiro Ishimaru, Takamatsu (JP)

(73) Assignee: NATIONAL UNIVERSITY CORPORATION KAGAWA UNIVERSITY, Takamatsu (JP)

( * ) Notice: Subject to any disclaimer, the term of this patent is extended or adjusted under 35 U.S.C. 154(b) by 0 days.

(21) Appl. No.: 18/691,179

(22) PCT Filed: Sep. 1, 2022

(86) PCT No.: PCT/JP2022/032916
§ 371 (c)(1),
(2) Date: Mar. 12, 2024

(87) PCT Pub. No.: WO2023/042668
PCT Pub. Date: Mar. 23, 2023

(30) Foreign Application Priority Data

Sep. 14, 2021 (JP) .................. 2021-149236

(51) Int. Cl.
*G01N 21/35* (2014.01)
(52) U.S. Cl.
CPC ..... *G01N 21/35* (2013.01); *G01N 2201/0633* (2013.01); *G01N 2201/0635* (2013.01)
(58) Field of Classification Search
None
See application file for complete search history.

(56) References Cited

U.S. PATENT DOCUMENTS 6,559,952 B1* 5/2003 Bokor ................ G01B 9/02043
356/520
6,687,010 B1* 2/2004 Horii ................... G01B 9/0205
356/479
(Continued)

FOREIGN PATENT DOCUMENTS

JP 2006-259264 A 9/2006
JP 2007-067123 A 3/2007
(Continued)

OTHER PUBLICATIONS

Oct. 11, 2022 International Search Report issued in International Patent Application No. PCT/JP2022/032916.
(Continued)

*Primary Examiner* — Marcus H Taningco
(74) *Attorney, Agent, or Firm* — Oliff PLC

(57) ABSTRACT

A spectrometry device 1 includes: a collimating optical system 15 configured to collimate object light from a measurement point a on a sample S; a photodetector 21 having a light-receiving face in which a plurality of pixels are arrayed in a predetermined direction; a conjugate plane imaging optical system 11 provided between the sample and the collimating optical system to form a plane optically conjugate with respect to a surface of the sample; an amplitude-type diffraction grating 1 disposed on the conjugate surface and having a light incident face on which the object light is incident or a light emission face from which the object light is emitted, the light incident face or the light emission face being formed by a light-shielding member made of a material having a light shielding rate higher than that of silicon in a wavelength band of the object light and provided with a plurality of openings, an optical path length differentiating optical system 16 configured to divide collimated object light into a first light beam and a second light beam to provide an optical path length difference; and an
(Continued)

interference optical system 17 configured to cause the first light beam and the second light beam provided with the optical path length difference to interfere with each other to form an interference image on the light-receiving face along the predetermined direction.

10 Claims, 12 Drawing Sheets

(56) References Cited

U.S. PATENT DOCUMENTS

| | | | | |
|---|---|---|---|---|
| 8,154,732 | B2* | 4/2012 | Bodkin | G01J 3/2823 356/451 |
| 9,482,576 | B2* | 11/2016 | Ishimaru | G01J 3/0208 |
| 2008/0074748 | A1 | 3/2008 | Kittaka et al. | |
| 2013/0188181 | A1* | 7/2013 | Angel | G01J 3/4531 356/301 |
| 2013/0215428 | A1 | 8/2013 | Ishimaru | |
| 2014/0286475 | A1* | 9/2014 | Nakamura | G01T 1/16 250/336.1 |
| 2015/0268097 | A1* | 9/2015 | Ishimaru | G01J 3/0208 356/456 |
| 2022/0316945 | A1 | 10/2022 | Ishimaru | |

FOREIGN PATENT DOCUMENTS

| | | | |
|---|---|---|---|
| JP | 2008-102488 | A | 5/2008 |
| JP | 2008-282322 | A | 11/2008 |
| JP | 2008-309706 | A | 12/2008 |
| JP | 2009-282322 | A | 12/2009 |
| JP | 2016-142522 | A | 8/2016 |
| JP | 2021-081362 | A | 5/2021 |
| WO | 2012/033096 | A1 | 3/2012 |
| WO | 2017/007024 | A1 | 1/2017 |
| WO | 2021/044979 | A1 | 3/2021 |

OTHER PUBLICATIONS

Oct. 11, 2022 Written Opinion issued in International Patent Application No. PCT/JP2022/032916.

Apr. 21, 2023 International Preliminary Report on Patentability issued in International Patent Application No. PCT/JP2022/032916.

* cited by examiner

SEVENTH EMBODIMENT

EIGHTH EMBODIMENT

SPECTROMETRY DEVICE

TECHNICAL FIELD

The present invention relates to a spectrometry device.

BACKGROUND ART

A method is known in which light is cast to a testing area in a living body, whereby components (such as glucose or cholesterol in blood) present in the testing area in the living body are qualified and quantized by measuring spectral characteristics of middle infrared object light such as transmitted light, diffused light, and scattered light emitted from the testing area. Methods for measuring spectral characteristics of object light include a method in which object light is converted into a parallel light beam by an objective lens, guided to an optical path length differentiating optical system, and divided into two light beams, then an optical path difference is provided between the two light beams, interference light is obtained by causing the two light beams to interfere with each other, and spectral characteristics are obtained from an intensity change of the interference light with respect to the optical path length difference between the two light beams. Conventionally, a system in which a fixed mirror and a movable mirror are disposed side by side is used as an optical path length differentiating optical system. Parallel light beams converted from object light are reflected by the fixed mirror and the movable mirror, and the movable mirror is moved in an optical axis direction while both light beams are caused to interfere with each other, so that the optical path length difference is imparted to the two light beams (for example, Patent Literature 1)

Patent Literature 2 proposes a method for measuring a change in intensity of interference light at once without using a moving mechanism of a movable mirror.

In Patent Literature 2, an optical path length differentiating optical system is used which includes two flat mirrors (a reference mirror and an inclined mirror) disposed side by side and having different inclinations of reflection faces. The reference mirror and the inclined mirror are disposed side by side along an axis perpendicular to a plane including the traveling direction of object light incident on the reference mirror and the traveling direction of the object light reflected by the reference mirror, and the reflection face of the inclined mirror is rotated about the axis. The object light is converted to parallel light beams, and the light beams are reflected by the respective reflection faces of the reference mirror and the inclined mirror. The light beams are each condensed in a direction of the axis by an imaging optical system, and focused on the same line segment perpendicular to the axis. On this line segment (imaging line segment), an interference image is formed by the light (reference reflected light) reflected by the reference mirror and the light (inclined reflected light) reflected by the inclined mirror. Since the reflection face of the reference mirror and the reflection face of the inclined mirror make an angle, a continuous optical path length difference according to the angle formed by both reflection faces is generated between the reference reflected light and the inclined reflected light. Therefore, an interferogram representing the intensity change of the interference light with respect to the optical path length difference between the two light beams can be obtained by detecting the light intensity change of the interference image along the imaging straight line. By Fourier-transforming the interferogram, the spectral characteristics of the object light can be obtained Patent Literature 3 to 5 propose using an amplitude-type diffraction grating for enhancing the definition of an interference image. In a spectrometry device described in Patent Literature 3, a plane optically conjugate with a surface (object face) of a sample is formed by using a conjugate plane imaging optical system, and an amplitude-type diffraction grating is disposed on this optically conjugate plane. The amplitude-type diffraction grating is formed by periodically providing openings in a light shielding plate made from, for example, a single crystal of silicon. Providing the plurality of openings in a direction parallel to the imaging line segment, it is expected to enhance the definition of the interference image. Patent Literature 4 discloses that providing a plurality of openings at a predetermined period in a direction perpendicular to the imaging line segment enhances the definition of the interference image. Furthermore, Patent Literature 5 describes that using an amplitude-type diffraction grating provided with openings as in Patent Literature 4 enhances the definition of the interference image in a spectrometry device using a fixed mirror and a movable mirror as described in Patent Literature 1.

CITATION LIST

Patent Literature

Patent Literature 1: JP 2008-309706 A
Patent Literature 2: WO 2012/033096 A
Patent Literature 3: WO 2021/044979 A
Patent Literature 4: WO 2017/007024 A
Patent Literature 5: JP 2016-142522 A

SUMMARY OF INVENTION

Technical Problem

However, it has been found that, even when an interference image is formed from object light of a sample using a spectrometry device as described in Patent Literature 3 to 5, the definition of interference light is not necessarily sufficiently high.

A problem to be solved by the present invention is to enhance the definition of an interference image of object light which is medium infrared rays emitted from a sample.

Solution to Problem

A spectrometry device according to the present invention made to solve the above problems includes:
- a collimating optical system configured to collimate object light emitted from a measurement point on a surface of a sample;
- a photodetector having a light-receiving face in which a plurality of pixels are linearly arrayed;
- a conjugate plane imaging optical system provided between the sample and the collimating optical system, the conjugate plane imaging optical system forming a plane optically conjugate with respect to a surface of the sample between the conjugate plane imaging optical system and the collimating optical system;
- an amplitude-type diffraction grating disposed on the conjugate surface and having a light emission face from which the object light is emitted, the light emission face being formed by a light-shielding member which is made of a material having a radiation rate lower than that of silicon and/or is configured to suppress re-entering light coming from the photodetector into the photodetector in a wavelength band of the object light compared to silicon and which is provided with a plurality of openings;

an optical path length differentiating optical system configured to divide object light collimated by the collimating optical system into a first light beam and a second light beam and provide an optical path length difference between the first light beam and the second light beam; and an interference optical system configured to cause the first light beam and the second light beam provided with the optical path length difference by the optical path length differentiating optical system to interfere with each other to form an interference image on the light-receiving face.

The amplitude-type diffraction grating may be entirely made of a material having a light shielding rate higher than that of silicon in the wavelength band of the object light, or only a light incident face or a light emission face may be formed of a material having a light shielding rate higher than that of silicon in the wavelength band. In addition, both the light incident face and the light emission face may be formed of a material having a light shielding rate higher than that of silicon.

One of the reasons why the definition of interference light is not high by the spectrometry device disclosed in Patent Literatures 3 to 5 is that object light is not completely blocked by light-shielding portions of an amplitude grating, and part of the object light passes through the light-shielding portions. In particular, in a case where the wavelength band of the object light is the infrared region, more object light is transmitted through the light-shielding portion.

Therefore, the spectrometry device according to the present invention uses an amplitude-type diffraction grating in which a light incident face on which the object light is incident or a light emission face from which the object light is emitted is formed by a light-shielding member made of a material having an absorptivity or a reflectance higher than that of silicon in the wavelength band of the object light and provided with a plurality of openings, the amplitude-type diffraction grating being disposed on the conjugate surface. Examples of the material having an absorptivity higher than that of silicon include quartz glass and various organic compounds. Examples of the material having a reflectance higher than that of silicon include aluminum and gold. The material is not limited to pure metal, and it is also possible to use any kind of metal having free electrons such as stainless steel (SUS).

The spectrometry device according to the present invention may have a configuration in which the light-shielding member includes a reflection member disposed on a side of the light incident face and made of the material having a reflectance higher than that of silicon in the wavelength band of the object light, and an absorbing member disposed on a side of the light emission face and made of a material having an absorptivity than that of silicon in a wavelength band of the object light.

In a case where the wavelength band of the object light is in the infrared region, the object light incident on the light-shielding portion can be absorbed by using a light-shielding member (absorbing member) made from a quartz glass having a thickness of about 0.1 mm in general. However, when the intensity of the object light is high, it may be difficult for the light-shielding member made only from a quartz glass to completely absorb the object light incident on the light-shielding portion. In the spectrometry device described above, the reflection member is disposed on the side of the light incident face of the absorbing member, and the object light is reflected by the reflection member, so that the object light transmitted through the light-shielding portion of the light-shielding member can be further reduced.

The spectrometry device according to the present invention may adopt a configuration that further includes a reinforcing member reinforcing the light-shielding member.

As described above, in a case where the wavelength band of the object light is in the infrared region, the object light incident on the light-shielding portion can be absorbed by using a light-shielding member made from a quartz glass having a thickness of about 0.1 mm in general. However, such a thin member has insufficient strength, so that the member is easily damaged and is difficult to handle. The spectrometry device described above includes the reinforcing member, and can thereby have sufficient strength. The reinforcing member can adopt any shape as long as the strength of the light-shielding member can be increased. Specifically, for example, the reinforcing member may be provided with a plurality of openings similarly to the light-shielding member, or may be a frame-shaped member reinforcing the peripheral portion of the light-shielding member.

It is preferable that, in the spectrometry device according to the present invention, if the light emission face of the light-shielding member is formed of a material having a reflectance higher than that of silicon in the wavelength band of the object light, the light emission face is subjected to antireflection processing.

For the antireflection processing, various types of antireflection processing can be used, for example, one with which a large number of structures each having a size equal to or less than the wavelength of the object light (subwavelength structure) are provided, one with which the light emission face is sandblasted to be a rough surface, one with which the light emission face is given an inclination to suppress direct reflection by the light emission face, and the like.

Mid-infrared-ray measuring photodetectors include a thermal-type photodetector and a quantum-type photodetector. The thermal-type photodetector makes target mid-infrared rays enter a substance having a temperature-dependent electric resistance, measures the electric resistance value of the substance, and thereby measures the intensity of mid-infrared rays. In contrast, the quantum-type photodetector photoelectrically converts incident mid-infrared rays to generate electric signals and detects the electric signals. The quantum-type photodetector has higher sensitivity than the thermal-type photodetector, but is generally expensive because the quantum-type photodetector is necessary to use a cooling mechanism for suppressing generation of thermal noise. Therefore, in a conventional spectrometry device, a thermal-type photodetector is often used in order to suppress the cost of the device. However, in the thermal-type photodetector, incident mid-infrared rays are thermally coupled to a sensor to generate heat, and thus radiation light due to the heat is generated. The radiation light re-entering the photodetector after being reflected by the amplitude-type diffraction grating also becomes a factor of deteriorating the definition of an interference image. In particular, when the light emission face is made of a material such as metal having a high reflectance as described above, the light emitted from the photodetector is directly reflected by the light emission face and enters the photodetector again. The spectrometry device described above uses an amplitude-type diffraction grating having the light emission face subjected to antireflection processing, so that the definition of interference light can be enhanced as compared with a conventional manner.

Advantageous Effects of Invention

By using the spectrometry device according to the present invention, the definition of an interference image of object light can be enhanced.

DESCRIPTION OF EMBODIMENTS

An example of the spectrometry device according to the present invention is hereinafter described with reference to the drawings.

First Example

Figure 1:
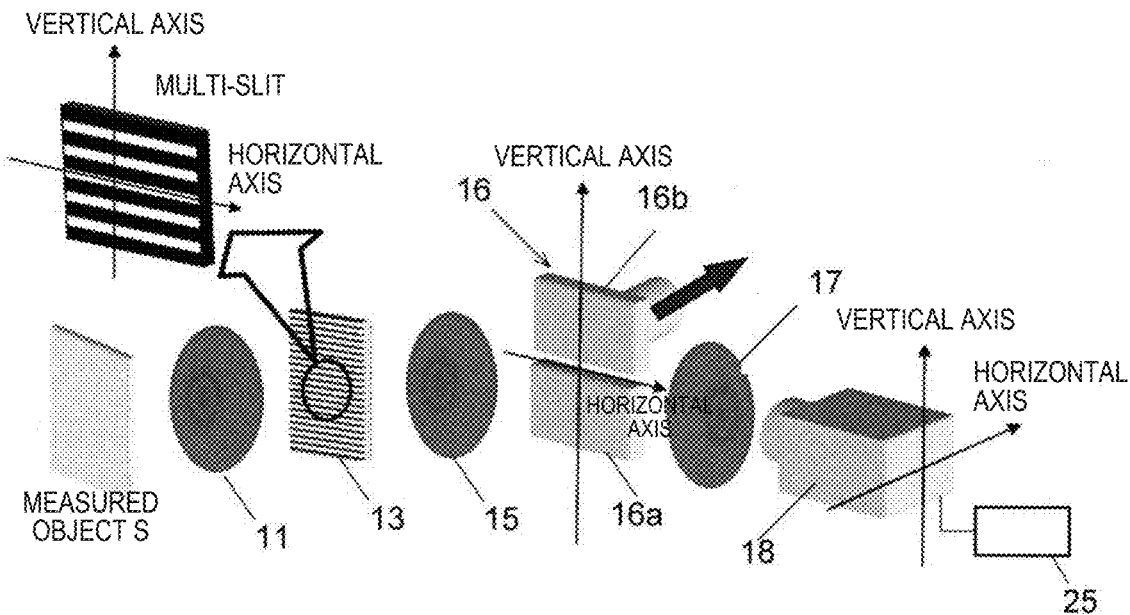
FIG. 1 is a schematic configuration view of a spectrometry device according to a first example of the present invention.
Figure 2:
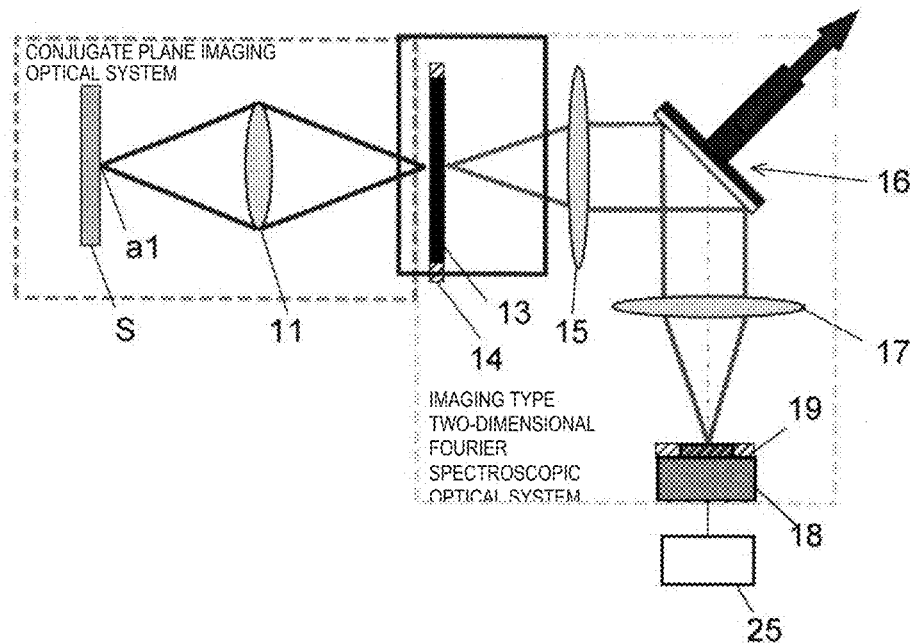
FIG. 2 is a top view of the spectrometry device according to the first example.

FIG. 1 shows a schematic configuration of a spectrometry device 1 according to a first example. FIG. 2 is a plane view of the spectrometry device 1. The spectrometry device 1 includes an imaging lens 11, a multi-slit 13, an objective lens 15, a phase shifter 16, an imaging lens 17, and a two-dimensional detector 18 in the order closest to a sample S. In the spectrometry device 1 according to the first example, a conjugate plane imaging optical system is configured between the sample S, the imaging lens 11, and the multi-slit 13. An imaging type two-dimensional Fourier spectroscopic optical system is configured between the multi-slit 13, the objective lens 15, the phase shifter 16, the imaging lens 17, and the two-dimensional detector 18. The spectrometry device 1 further includes an arithmetic operation unit configured to obtain an interferogram from a detection signal of the two-dimensional detector 18 and mathematically performs the Fourier-transform on the interferogram to obtain a spectral characteristic (spectrum) that is a relative intensity for each wavelength of the radiation light, and a control/processing unit 25 having functions of a processing unit, for example, imaging an arithmetic operation result of the arithmetic operation unit.

By the imaging lens 11, light (object light) emitted in various directions from each of a large number of measurement points disposed on the surface of the sample S is condensed on the position of the multi-slit 13. The imaging lens 11 forms a plane optically conjugate with the surface of the sample S at the position of the multi-slit 13. The imaging lens 11 corresponds to the conjugate plane imaging optical system in the present invention. FIG. 2 shows one of a large number of measurement points as a measurement point a1.

The phase shifter 16 is installed to be inclined by about 45° with respect to the optical axis of the incident object light, and includes a fixed mirror unit 16a and a movable mirror unit 16b that are disposed vertically on an upper side and a lower side, respectively. The movable mirror unit 16b is moved in a direction indicated by an arrow by a driving mechanism (not shown). The fixed mirror unit 16a or the movable mirror unit 16b may be disposed on either the upper side or the lower side. Here, the movable mirror unit 16b is disposed on the upper side, and the fixed mirror unit 16a is disposed on the lower side. The fixed mirror unit and the movable mirror unit can be disposed on the left and the right, respectively. However, in this case, when the movable mirror unit is largely moved, the fixed mirror unit is shaded by the movable mirror unit and thus a light beam from the fixed mirror unit to the two-dimensional detector may be blocked. It is therefore preferable that the fixed mirror unit and the movable mirror unit are disposed in the vertical direction. The phase shifter 16 corresponds to the optical path length differentiating optical system in the present invention.

The imaging lens 17 causes the object light reflected by the fixed mirror unit 16a and the object light reflected by the movable mirror unit 16b to interfere with each other and converges the interfered object light on a light-receiving face of the two-dimensional detector 18. The imaging lens 17 corresponds to the interference optical system in the present invention.

Figure 3:
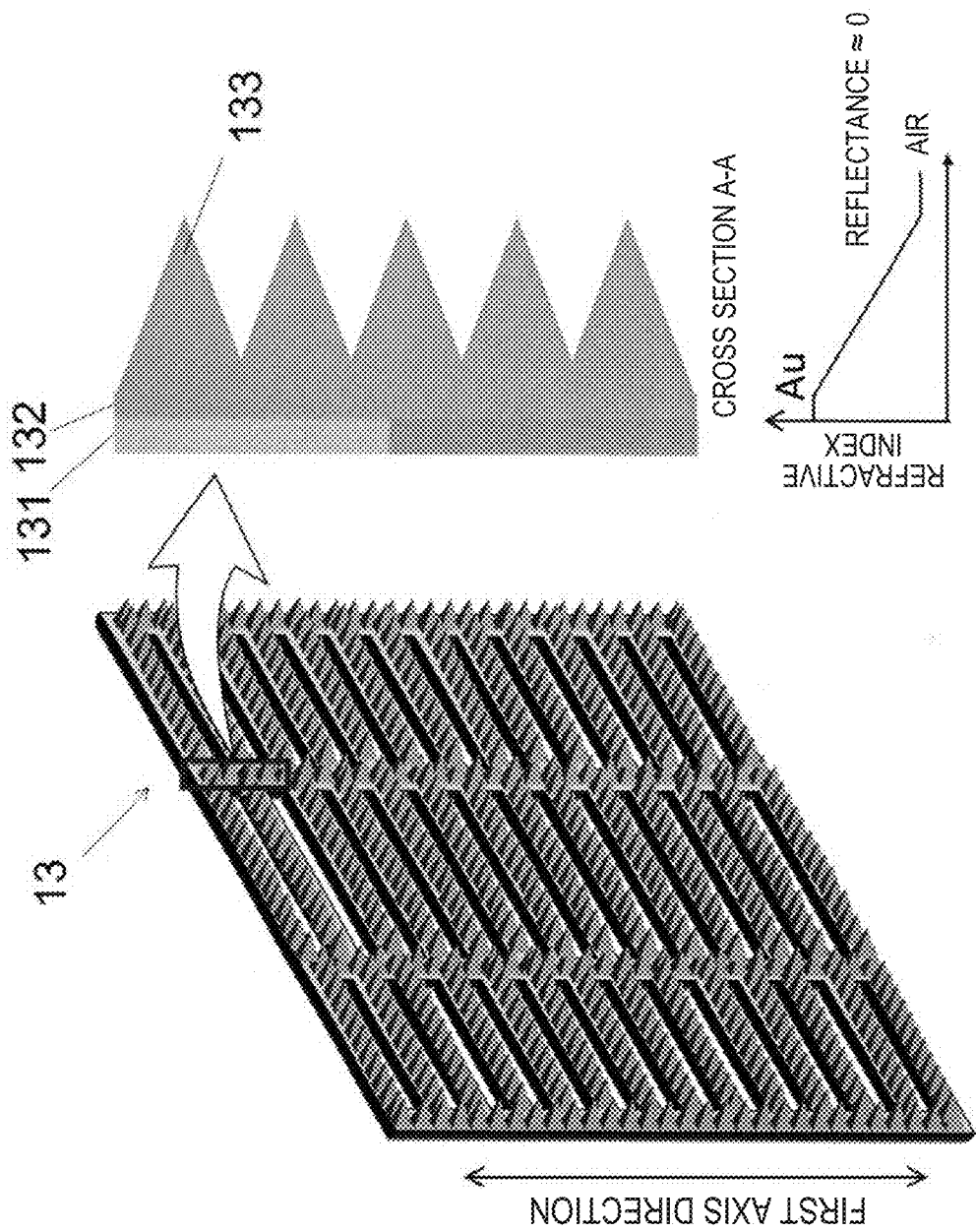
FIG. 3 is a view showing a configuration of a multi-slit of the spectrometry device according to the first example.

The multi-slit 13 corresponds to the amplitude-type diffraction grating in the present invention. The multi-slit 13 is formed by etching a single crystal of silicon to form openings 132, forming a subwavelength structure (SWC) in which convex portions 133 each having a quadrangular pyramidal shape are periodically disposed on the single crystal of silicon with a period equal to or less than the wavelength of object light emitted from the sample S, and depositing gold on the surface of the SWC. As shown in FIG. 3, in the multi-slit 13, the plurality of openings 132 each having a belt shape are periodically disposed in one direction (first axis direction) on a base member 131 having a rectangular plate shape and a light shielding property with respect to mid-infrared light to be measured. On a side peripheral portion of the multi-slit 13, a cooling member 14 (see FIG. 2; not shown in FIGS. 1 and 3) for cooling the multi-slit 13 is disposed. As the cooling member 14, for example, a Peltier element or a member having a flow path in which a refrigerant fluid flows can be used.

Similarly to the spectrometry devices described in Patent Literature 4 and 5, a length $W_1$ of the opening 132 in the first axis direction and a period $L_1$ of the openings 132 adjacent to each other in the first axis direction are designed to satisfy the following expressions (1) and (2), respectively.

$$W_1 = P_1 \times 2/(m+1) \quad (1)$$

$$L_1 = P_1 \times 2/m \quad (2)$$

Here, $P_1$ is an interval between pixels 181 of the two-dimensional detector 18 in the first axis direction, and m is an optical magnification of an optical system including the multi-slit 13, the objective lens 15, the phase shifter 16, the imaging lens 17, and the two-dimensional detector 18.

In a cross section containing the vertical axis of phase shifter 16, the fixed mirror unit 16a and the movable mirror unit 16b are irradiated with the object light, but in a cross section containing the horizontal axis, either one of the fixed mirror unit 16a and the movable mirror unit 16b is irradiated with the object light. That is, the optical path length difference changes and the interference intensity changes with the movement of movable mirror unit 16b in a cross section containing the vertical axis, but there is no optical path length difference and no interference intensity change occurs in a cross section containing the horizontal axis. Therefore, in the first example, the multi-slit 13 having a combination of openings and light-shielding portions configured to eliminate phase cancellation between bright spots (measurement points) is disposed in the vertical axis direction (first axis direction).

Figure 4:
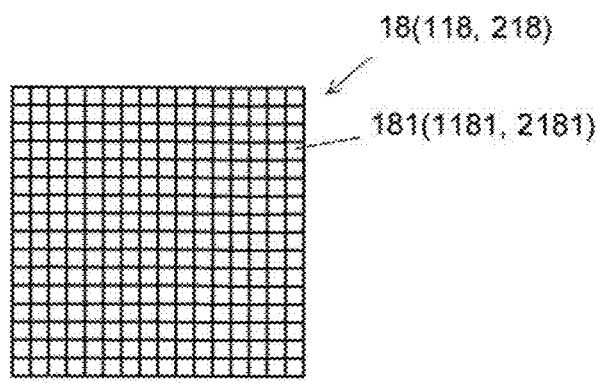
FIG. 4 is a view showing a pixel array of a two-dimensional detector of the spectrometry device according to the first example.

As shown in FIG. 4, the two-dimensional detector 18 has a plurality of pixels disposed in a lattice pattern (period $P_1$ in the first axis direction and period $P_2$ in the second axis direction; $P_1=P_2$ in the present example). The two-dimensional detector 18 is a thermal-type photodetector. The thermal-type photodetector converts heat generated by thermally coupling incident mid-infrared rays and a sensor into electric signals and detects the electric signals. Specific examples of the thermal-type detector include a microbolometer array sensor. In order to prevent radiation light due to the heat generated inside the two-dimensional detector 18 from being emitted to the outside, the light-receiving face is cooled by a cooling member 19 (not shown in FIGS. 1 and 4). As the cooling member 19, for example, a Peltier element or a member having a flow path in which a refrigerant fluid flows can be used.

The processing unit 25 obtains an interferogram from the light intensity distribution of the interference image obtained by the two-dimensional detector 18 and Fourier-transforms the interferogram to obtain a spectrum of the measurement point.

In the spectrometry device 1 according to the first example, by the imaging lens 11, the object light emitted from each of a large number of the measurement points located on the surface of the sample S is condensed on the position of the multi-slit 13. The object light having passed through the openings 132 of the multi-slit 13 is collimated by the objective lens 15 and incident on the fixed mirror unit 16a and the movable mirror unit 16b of the phase shifter 16. In the first example, by moving the movable mirror unit 16b, an optical path length difference is imparted between the object light reflected by the fixed mirror unit 16a and the object light reflected by the movable mirror unit 16b, and then an image is formed on the light-receiving face of the two-dimensional detector 18 by the imaging lens 17.

In FIG. 2, only the optical path of the object light emitted from one measurement point a1 on the surface of the sample S is shown in order to clearly illustrate the optical path of the object light, but actually, interference light is formed from the object light emitted from each of the plurality of measurement points a that are two-dimensionally distributed on the surface of the sample S, and is incident on each light receiving element two-dimensionally arrayed on the light-receiving face of the two-dimensional detector 18.

The spectrometry device 1 according to the first example is particularly characterized by the configuration of the multi-slit 13 (configuration having a subwavelength structure that is formed on the surface facing the detector and on which gold is deposited), the cooling member 14 configured to cool the multi-slit 13, and the cooling member 19 configured to cool the light-receiving face of the two-dimensional detector 18. The spectrometry device 1 according to the first example includes all of these three configurations as a preferred specific mode of the present invention, but can adopt a configuration including only some of these three features.

Here, the above three features will be described.

In order to investigate a factor that does not increase the definition of an interference image in the conventional spectrometry device, the present inventor conducted an experiment of measuring radiation light emitted from a black body at each temperature by heating or cooling the black body to a plurality of different temperatures at room temperature to check a change in luminance amplitude of the interference image. The magnitude of the luminance amplitude corresponds to the height of the center burst in an interferogram. As a conventional spectrometry device, a device having a configuration obtained by removing the above three features from the spectrometry device 1 according to the above-described example was used.

Figure 5:
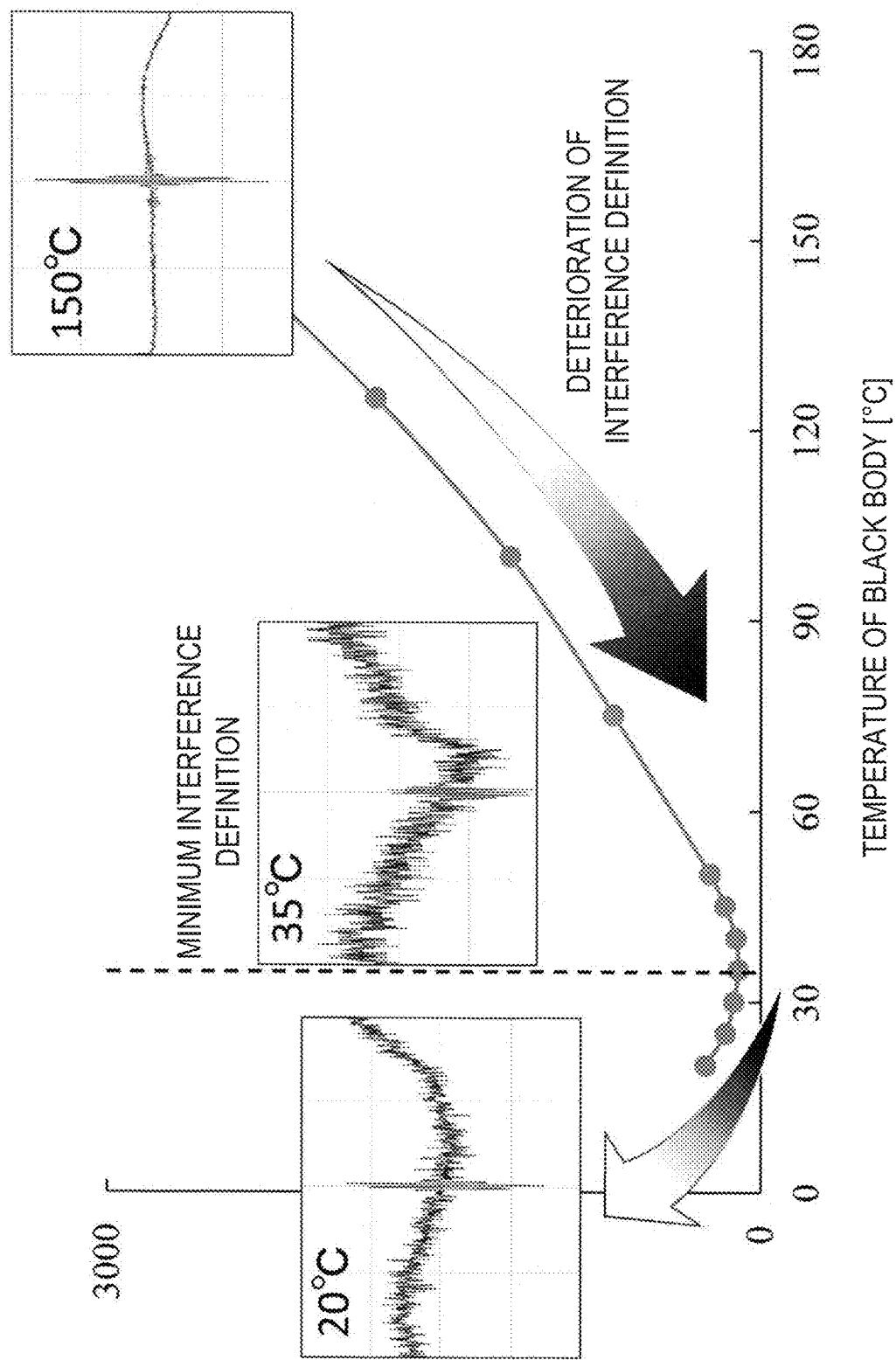
FIG. 5 is a view showing a result of an experiment using a conventional spectrometry device.
Figure 6:
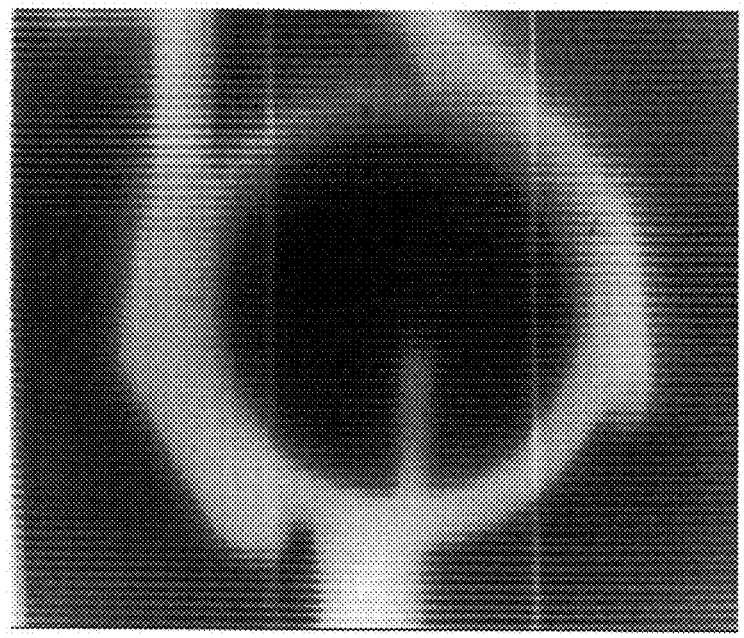
FIG. 6 is an image obtained in the experiment using the conventional spectrometry device.

FIG. 5 is a graph showing the result of the above experiment. As shown in this graph, in the conventional spectrometry device, the luminance amplitude of the interference light obtained when the black body was heated to about 35° C. close to room temperature was minimized. A gas cell filled with DME gas was disposed on the surface of a refrigerant, and a mid-infrared image of the surface of the refrigerant was captured. As shown in FIG. 6, the luminance at the position of the light-shielding portion was higher than the luminance at the position of the opening. The results shown in FIGS. 5 and 6 suggest that light of the same degree as the radiation light from the black body heated to about 35° C. is incident on the two-dimensional detector from the light-shielding portion of the slit, and a part of the light is considered to be the radiation light from the slit.

An experiment conducted to check light incident from the light-shielding portion of the slit in further detail will be described. In this experiment, the luminance amplitude of the interference light emitted from the black body was measured while the black body was heated to a plurality of different temperatures in each of the configuration in which the gold deposition surface was disposed on the two-dimensional detector side (light emission face) (at the normal time shown in FIG. 7) and the configuration in which the gold deposition surface was disposed on the sample S side (light incident face) (pseudo-stealth multi-slit shown in FIG. 7) using the slit formed by depositing gold on the surface of a single crystal of silicon.

Figure 7:
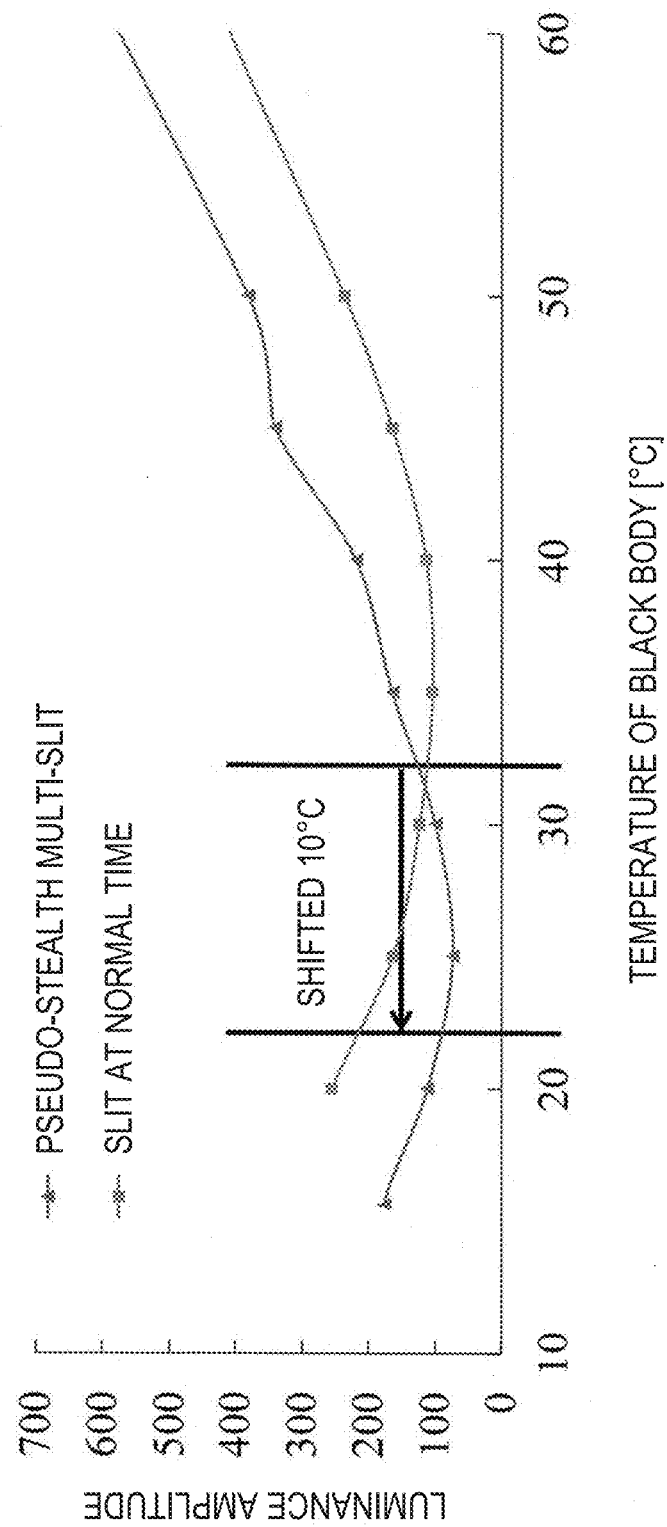
FIG. 7 is a view showing a result of measuring a change in brightness of an interference image with respect to a temperature of a sample while changing a direction of the slit.

FIG. 7 shows the result of the above experiment. As illustrated in FIG. 7, in the configuration in which the gold deposited surface is disposed on the two-dimensional detector side, the brightness is minimized when the temperature of the black body is raised to 35° C., whereas in the configuration in which the gold deposited surface is disposed on the sample S side, the brightness is minimized when the temperature of the black body is 25° C., and it has been found that the temperature at which the luminance amplitude is minimized changes when the material constituting the surface of the slit facing the two-dimensional detector is changed. Since the emissivity (rate of radiation) of gold is lower than the emissivity of silicon, in the case where there is only the radiation light from the slit, the configuration in which the gold deposition surface is disposed to face the two-dimensional detector should have less light incident on the two-dimensional detector, and the temperature at which the luminance amplitude is minimized should be lower. However, the temperature at which the luminance amplitude is minimized is actually higher when the gold deposited surface faces the two-dimensional detector side as described above. In view of the fact that the reflectance of silicon is smaller than that of gold, and that a thermal-type detector is used as the two-dimensional detector, it is considered that another factor causing light to be emitted from the slit is that radiation light due to heat generated inside the two-dimensional detector is reflected by the light-shielding portion of the slit, and the radiation light is incident on the two-dimensional detector again.

As described above, it is considered that factors causing light to be emitted from the slit are the light radiated from the base member of the slit and the light emitted from the two-dimensional detector and reflected by the light-shielding portion of the slit. In the spectrometry device 1 of the first example, by using a material in which gold is deposited on the surface on the two-dimensional detector 18 side as the base member 131 of the multi-slit 13, the emissivity is reduced (the radiation light from the slit itself is suppressed) as compared with the base member made of a single crystal of silicon. The subwavelength structure (SWC) in which the convex portions 133 are disposed with a period equal to or less than the wavelength of the object light emitted from the sample S is produced by surface forming, so that the reflectance (reflection of the radiation light from the two-dimensional detector 18) is reduced. By cooling the multi-slit 13 by the cooling member 14, the radiation light of the multi-slit 13 itself is further suppressed. Furthermore, by cooling the light-receiving face of the two-dimensional detector 18 with the cooling member 19, radiation light due to heat generated inside the two-dimensional detector 18 is also suppressed. By using at least some of these features, it is possible to enhance the definition of interference light as compared with the conventional spectrometry device. For example, by using, instead of the multi-slit 13 of the first example described above, the above-described pseudo-stealth multi-slit, it is possible to adopt a configuration in which the reflection of the radiation light from the two-dimensional detector 18 is reduced and the radiation light of the slit itself is suppressed by cooling the multi-slit 13 with the cooling member 14.

Second Example

Similarly to the first example, a spectrometry device 100 of a second example is also used to obtain the optical spectrum of the mid-infrared light emitted from the sample to be analyzed. In the spectrometry device 100 of the second example, the interferogram of the object light emitted from each of the measurement points al distributed on the surface of the sample S in the first axis direction is obtained.

Figure 8:
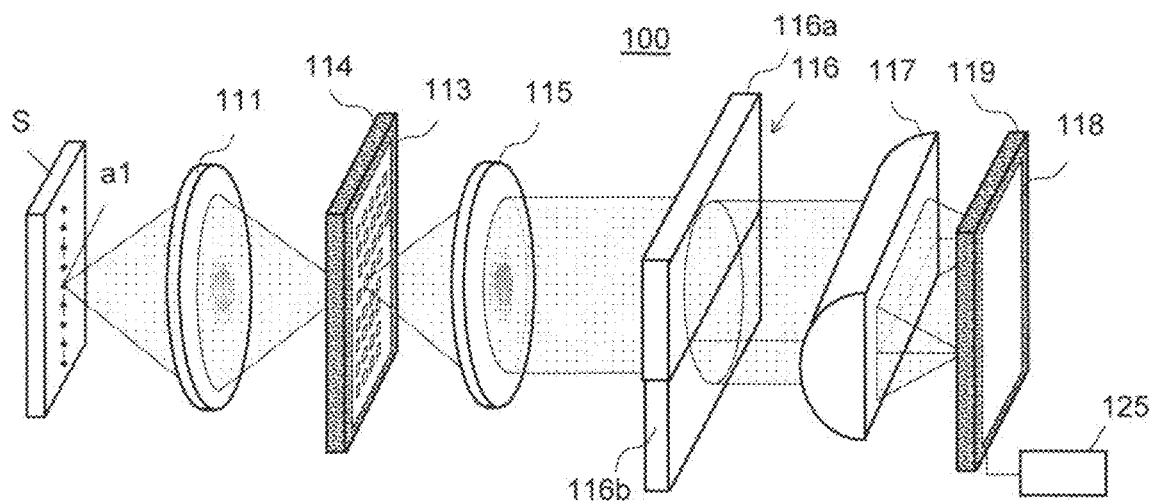
FIG. 8 is a schematic configuration view of a spectrometry device according to a second example of the present invention.
Figure 9:
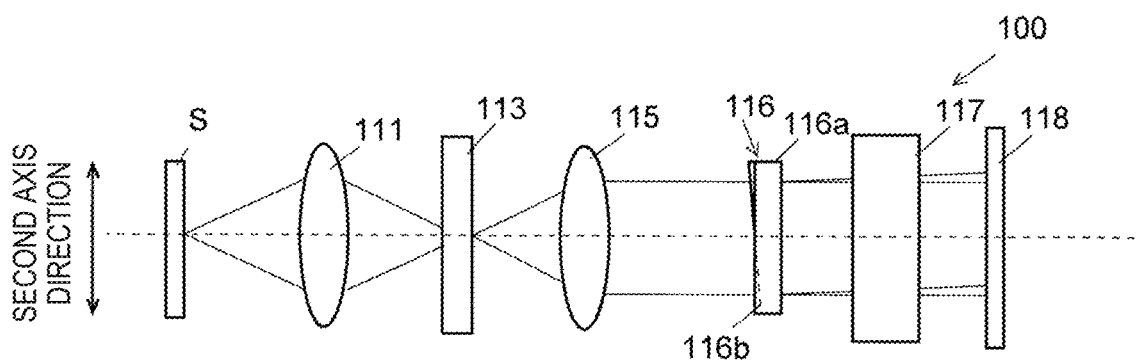
FIG. 9 is a top view of the spectrometry device according to the second example.
Figure 10:
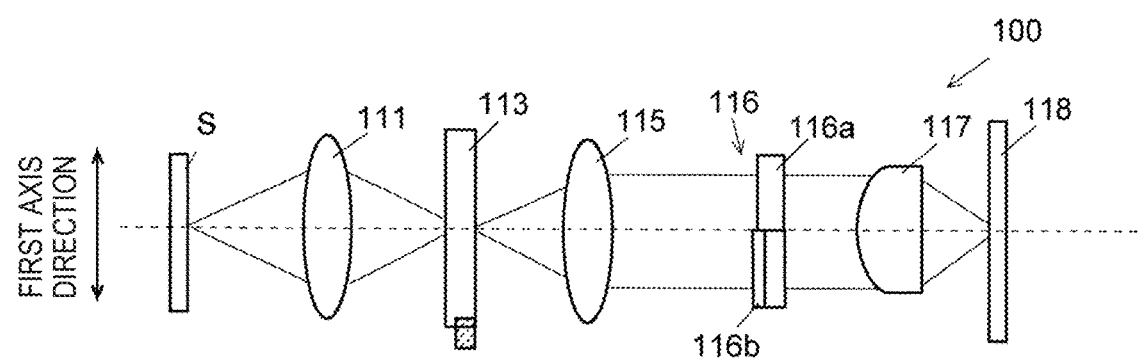
FIG. 10 is a side view of the spectrometry device according to the second example.

FIG. 8 shows a schematic configuration of the spectrometry device 100 according to the second example. FIGS. 9 and 10 are a plane view and a side view of the spectrometry device 100. The spectrometry device 100 includes an imaging lens 111, a two-dimensional slit 113, an objective lens 115, a phase shifter 116, a cylindrical lens 117, and a two-dimensional detector 118 in the order closest to the sample S. The spectrometry device 100 includes an arithmetic operation unit configured to obtain an interferogram from a detection signal of the two-dimensional detector 118 and mathematically performs the Fourier-transform on the interferogram to obtain a spectral characteristic (spectrum) that is a relative intensity for each wavelength of the radiation light, and a control/processing unit 125 having functions of a processing unit, for example, imaging an arithmetic operation result of the arithmetic operation unit.

By the imaging lens 111, the object light emitted in various directions from each of the measurement points disposed on the surface of the sample S is condensed on the position of the two-dimensional slit 113. The imaging lens 111 forms a plane optically conjugate with the surface of the sample S at the position of the two-dimensional slit 113. The imaging lens 111 corresponds to the conjugate plane imaging optical system in the present invention.

The two-dimensional slit 113 corresponds to the amplitude-type diffraction grating in the present invention. As shown in the front view and the side view in FIG. 11, in the two-dimensional slit 113, a plurality of openings 1132 are periodically disposed in two directions (first axis direction and second axis direction) orthogonal to each other on a base member 1131 having a rectangular plate shape and a light shielding property with respect to mid-infrared light to be measured. Similarly to the spectrometry devices described in Patent Literatures 4 and 5, in the first axis direction, a length $W_1$ of the opening 1132 in the first axis direction and a period $L_1$ of the openings 1132 adjacent to each other in the first axis direction are designed to satisfy the following expressions (1) and (2), respectively.

$$W_1 = P_1 \times 2/(m+1) \tag{1}$$

$$L_1 = P_1 \times 2/m \tag{2}$$

Here, $P_1$ is an interval between pixels of the two-dimensional detector 118 in the first axis direction, and m is an optical magnification of an optical system including the two-dimensional slit 113, the objective lens 115, the phase shifter 116, the cylindrical lens 117, and the two-dimensional detector 118.

Similarly to the spectrometry device described in Patent Literature 3, in the second axis direction, a length $W_2$ of the opening 1132 in the second axis direction and a period $L_2$ of the openings 1132 adjacent to each other in the second axis direction are designed to satisfy the following expressions (3) and (4).

$$W_2 = \{(\lambda_c \times f)/2\% \Delta\lambda \times h\} \times P_2 \tag{3}$$

$$L_2 = 2 \times (\lambda_c \times f)/2 \times \Delta\lambda \times P_2 \tag{4}$$

Here, $\lambda_c$ is a wavelength included in object light, f is a focal length of the objective lens 115, $\Delta\lambda$ is a difference between optical path lengths of a first light beam of the object light having passed through a first transmission portion 116a (described later) and a second light beam of the object light having passed through a second transmission portion 116b (described later), which are incident on pixels adjacent to each other in the second axis direction in the two-dimensional detector 118, and h is a distance from the phase shifter 116 to a light-receiving face of the two-dimensional detector 118. By providing the openings 1132 that satisfy the above expressions (3) and (4), the phases of the object light passing through the adjacent openings 1132 are aligned.

Figure 11:
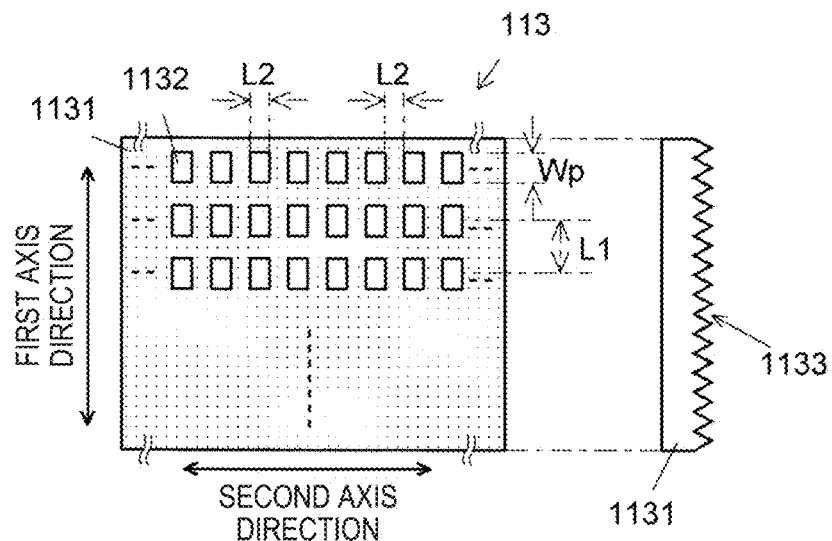
FIG. 11 is a view showing a configuration of a two-dimensional slit of the spectrometry device according to the second example.

Similarly to the slit 13 according to the first example, the two-dimensional slit 113 in the second example is also formed by etching a single crystal of silicon to form the openings 1132, forming a subwavelength structure (SWC) in which convex portions 1133 each having a quadrangular pyramidal shape are periodically disposed on the single crystal of silicon with a period equal to or less than the wavelength of object light emitted from the sample S as shown in FIG. 11, and depositing gold on the surface of the SWC. The surface on the side on which the convex portions 1133 are formed is disposed on the two-dimensional detector 118 side. A cooling member 114 (not shown in FIGS. 9 to 11) for cooling the two-dimensional slit 113 is attached to a peripheral portion of the two-dimensional slit 113. As the cooling member 114, for example, a Peltier element similar to the first example or a member having a flow path in which a refrigerant fluid flows can be used.

The objective lens 115 collimates the light passing through the openings 1132 of the two-dimensional slit 113. The objective lens 115 corresponds to the collimating optical system in the present invention.

The phase shifter 116 includes the first transmission portion 116a and the second transmission portion 116b that are made of a material having transparency to mid-infrared light and are disposed side by side in the second axis direction. The first transmission portion 116a is a rectangular plate-like optical member having a constant thickness in which a light incident face and a light emission face are parallel. The second transmission portion 116b is a trapezoidal optical member in plane view the thickness of which continuously changes along the second axis. The second transmission portion 116b has: a light incident face inclined with respect to the light incident face of the first transmission portion 116a; and a light emission face on the same plane as the light emission face of the first transmission portion 116a. The phase shifter 116 corresponds to the optical path length differentiating optical system in the present invention.

The cylindrical lens 117 is a semicircular columnar member made of a material having transparency to mid-infrared light. The cylindrical lens 117 is disposed so that the convex side faces the phase shifter 116 side, the flat surface faces the two-dimensional detector 118 side, and the semicircular cross section is disposed orthogonal to the second axis. The cylindrical lens 117 corresponds to the interference optical system in the present invention.

Similarly to the first example, the two-dimensional detector 118 has a plurality of pixels disposed in a lattice pattern (period P; in the first axis direction and period $P_2$ in the second axis direction; $P_1=P_2$ in the present example). In the second example, similarly to the first example, a thermal photodetector is used as the two-dimensional detector 118. In order to prevent radiation light due to the heat generated inside the two-dimensional detector 118 from being emitted to the outside, the light-receiving face is cooled by a cooling member 119 (not shown in FIGS. 9 and 10). As the cooling member 119, for example, a Peltier element similar to the first example or a member having a flow path in which a refrigerant fluid flows can be used.

The control/processing unit 125 obtains an interferogram from the light intensity distribution of the interference image obtained by the two-dimensional detector 118 and Fourier-transforms the interferogram to obtain a spectrum of the measurement point.

In the spectrometry device 100 according to the second example, by the imaging lens 111, the object light that is mid-infrared light emitted from one of the measurement points al located on the surface of the sample S is condensed on the position of the two-dimensional slit 113. The object light having passed through the openings 1132 of the two-dimensional slit 113 is collimated by the objective lens 115 and incident on the first transmission portion 116a and the second transmission portion 116b of the phase shifter 116. As described above, since the light incident face of the second transmission portion 116b is inclined with respect to the light incident face of the first transmission portion 116a, and the light emission faces of the first transmission portion 116a and the second transmission portion 116b are located on the same plane, a continuous optical path length difference is provided along the second axis between the object light (first light beam) having passed through the first transmission portion 116a and the object light (second light beam) having passed through the second transmission portion 116b. The object light having passed through the first transmission portion 116a and the object light having passed through the second transmission portion 116b are condensed in the first axis direction by the cylindrical lens 117, and formed as a linear interference image along the second axis on the light-receiving face of the two-dimensional detector 118.

In FIGS. 8 to 10, only the optical path of the object light emitted from one measurement point al on the surface of the sample S is shown in order to clearly illustrate the optical path of the object light, but actually, interference images are formed side by side along the first axis direction from the object light emitted from each of the plurality of measurement points adjacent to the measurement point al in the first axis direction, on the light-receiving face of the two-dimensional detector 118. Therefore, in the spectrometry device 100 according to the second example, the interference images formed by the object light emitted from each of the plurality of measurement points adjacent to each other along the first axis on the surface of the sample S can be simultaneously detected by the two-dimensional detector 118.

Similarly to the first example, the spectrometry device 100 of the second example is also characterized by the configuration of the two-dimensional slit 113, the cooling member 114 configured to cool the two-dimensional slit 113, and the cooling member 119 configured to cool the two-dimensional detector 118. Therefore, the definition of the interference image can be enhanced similarly to the first example. The spectrometry device 100 according to the second example includes all of these three configurations as another preferred specific mode of the present invention, but can adopt a configuration including only some of these three features. For example, by using, instead of the two-dimensional slit 113 of the second example described above, a pseudo-stealth multi-slit on which the openings are two-dimensionally provided similarly to the two-dimensional slit 113, it is possible to adopt a configuration in which the reflection of the radiation light from the two-dimensional detector 118 is reduced and the radiation light of the slit itself is suppressed by cooling the two-dimensional slit 113 with the cooling member 114.

Third Example

A spectrometry device 200 according to a third example obtains the interferogram of the object light emitted from each of the measurement points al on the surface of the sample S.

Figure 12:
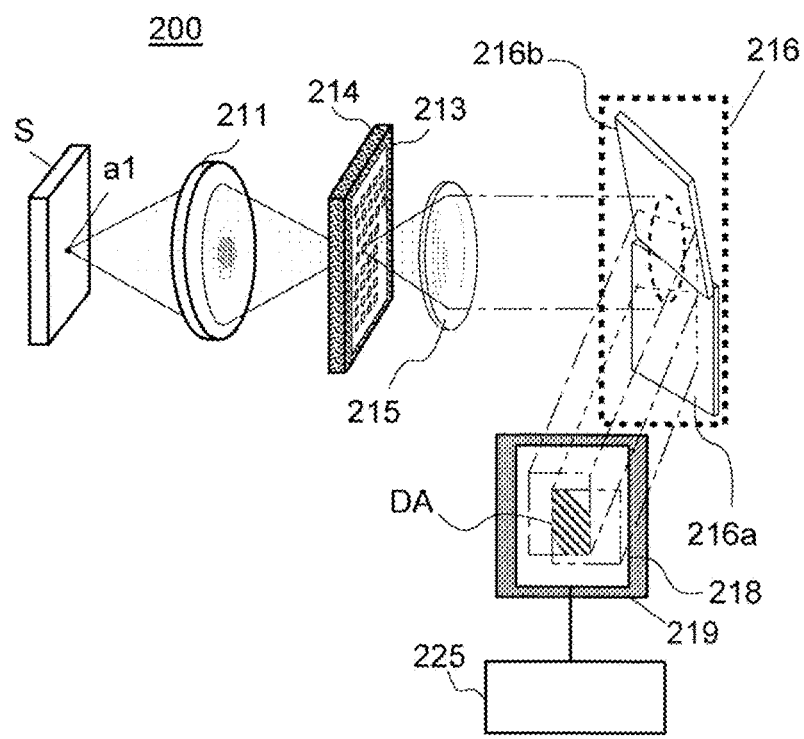
FIG. 12 is a schematic configuration view of a spectrometry device according to a third example of the present invention.
Figure 13:
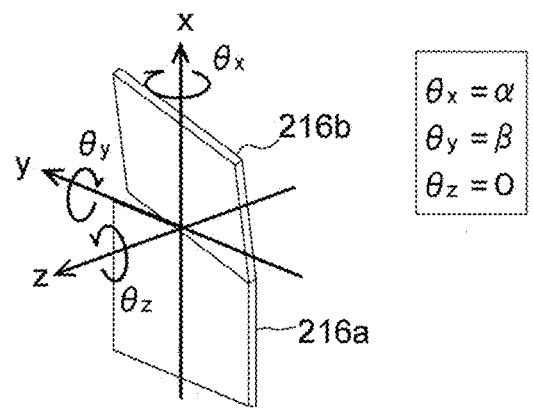
FIG. 13 is a view showing a configuration of a phase shifter of the spectrometry device according to the second example.

FIG. 12 shows a schematic configuration of the spectrometry device 200 according to the third example. The spectrometry device 200 includes an imaging lens 211, a two-dimensional slit 213, an objective lens 215, a phase shifter 216, and a two-dimensional detector 218 in the order closest to the sample S. The spectrometry device 200 includes an arithmetic operation unit configured to obtain an interferogram from a detection signal of the two-dimensional detector 218 and mathematically performs the Fourier-transform on the interferogram to obtain a spectral characteristic (spectrum) that is a relative intensity for each wavelength of the radiation light, and a control/processing unit 225 having functions of a processing unit, for example, imaging an arithmetic operation result of the arithmetic operation unit.

By the imaging lens 211, the object light emitted in various directions from each of the measurement points disposed on the surface of the sample S is condensed on the position of the two-dimensional slit 213. The imaging lens 211 forms a plane optically conjugate with the surface of the sample S at the position of the two-dimensional slit 213. The imaging lens 211 corresponds to the conjugate plane imaging optical system in the present invention.

The two-dimensional slit 213 corresponds to the amplitude-type diffraction grating in the present invention. Similarly to the two-dimensional slit 113 of the second example, the two-dimensional slit 213 is provided with opening portions two-dimensionally disposed, and a cooling member 214 is attached to a side peripheral portion of the two-dimensional slit 213.

The objective lens 215 collimates the light passing through the openings 1132 of the two-dimensional slit 213. The objective lens 215 corresponds to the collimating optical system in the present invention.

A phase shifter 29 corresponds to the optical path length differentiating optical system and the interference optical system in the present invention. The phase shifter 216 includes a reference mirror 216a and an inclined mirror 216b. The reference mirror 216a and the inclined mirror 216b are disposed side by side in the vertical direction (x-axis direction). The inclined mirror 216b is installed so that the reflection face of the inclined mirror 216b is made parallel with a virtual surface defined by rotating the reflection face of the reference mirror 216a by a predetermined angle θx about the x-axis and further rotating the reflection face by a predetermined angle θy about one axis (y-axis) in a horizontal direction. As a result, the reflection face of the inclined mirror 216b is inclined in the y-axis direction and the z-axis direction with respect to the reflection face of the reference mirror 216a.

When θx=α° and θy=β°, the traveling direction of the inclined reflected light deviates with respect to the traveling direction of the reference reflected light by 20° in the y-axis direction by the inclination (rotation about the x-axis) in the y-axis direction, and this deviation angle causes an optical path length difference between the reference reflected light and the inclined reflected light. By the inclination in the z-axis direction (rotation about the y-axis), the traveling direction of the inclined reflected light is inclined in the z-axis direction, and the inclined reflected light and the reference reflected light intersect at a position away from a phase shifter 216 by a predetermined distance. The distance from the phase shifter 216 to the point where both the inclined reflected light and the reference reflected light intersect is determined according to the angle θy=β°, and the light-receiving face of the detector 218 is disposed at such a point.

Similarly to the first and the second examples, the two-dimensional detector 218 has a plurality of pixels disposed in a lattice pattern (period P; in the first axis direction and period $P_2$ in the second axis direction; $P_1=P_2$ in the present example). In the third example, similarly to the first example and the second example, a thermal photodetector is used as the two-dimensional detector 218. In order to prevent radiation light due to the heat generated inside the two-dimensional detector 218 from being emitted to the outside, the light-receiving face is cooled by a cooling member. As a cooling member 219, for example, a Peltier element similar to the first and the second examples or a member having a flow path in which a refrigerant fluid flows can be used.

The processing unit 225 obtains an interferogram from the light intensity distribution of the interference image obtained by the two-dimensional detector 218 and Fourier-transforms the interferogram to obtain a spectrum of the measurement point.

In the spectrometry device 200 according to the third example, by the imaging lens 211, the object light that is mid-infrared light emitted from one of the measurement points al located on the surface of the sample S is condensed on the position of the two-dimensional slit 213. The object light having passed through the openings of the two-dimensional slit 213 is collimated by the objective lens 215 and incident on the reference mirror 216a and the inclined mirror 216b of the phase shifter 216. The object light reflected by the reference mirror 216a and the object light reflected by the inclined mirror 216b are incident on the light-receiving face of the two-dimensional detector 218 in a planar shape, and respective incident regions partially overlap each other. As described above, since there is an optical path length difference between the reference reflected light and the inclined reflected light, an interference image is formed in a region (overlap region DA) on which the light reflected by the reference mirror 216a and the light reflected by the inclined mirror 216b overlapping each other are incident. Therefore, an interferogram of the measurement point al can be obtained by detecting the intensity distribution of light of this interference image, and the spectral characteristics of the measurement point al can be obtained by Fourier-transforming the interferogram.

Similarly to the first example and the second example, the spectrometry device 200 of the third example is also characterized by the configuration of the two-dimensional slit 213, the cooling member 214 configured to cool the two-dimensional slit 213, and the cooling member 219 configured to cool the two-dimensional detector 218. Therefore, the definition of the interference image can be enhanced similarly to the first and the second examples. The spectrometry device 200 according to the third example includes all of these three configurations as another preferred specific mode of the present invention, but can adopt a configuration including only some of these three features. For example, by using, instead of the two-dimensional slit 213 of the third example described above, a pseudo-stealth multi-slit on which the openings are two-dimensionally provided similarly to the two-dimensional slit 213, it is possible to adopt a configuration in which the reflection of the radiation light from the two-dimensional detector 218 is reduced and the radiation light of the slit itself is suppressed by cooling the two-dimensional slit 213 with the cooling member 214.

The first to third examples described above each are merely a preferable example of the present invention and can be appropriately modified along the gist of the present invention.

Figure 14:
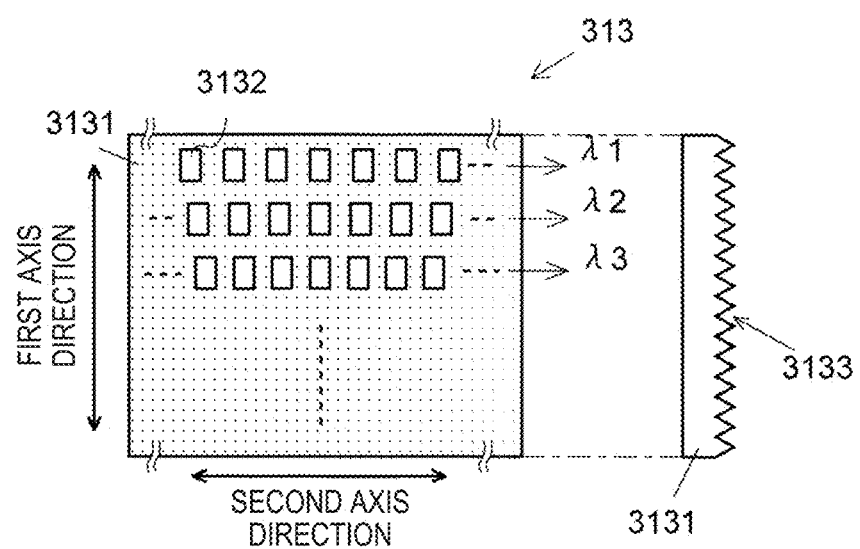
FIG. 14 is a view showing a configuration of a two-dimensional slit of a modification.
Figure 15A:
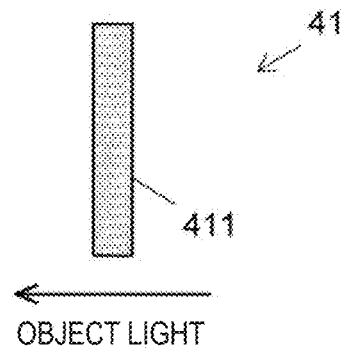
FIGS. 15A to 15H are views of embodiments of an amplitude-type diffraction grating of the spectrometry device according to the present invention.
Figure 15B:
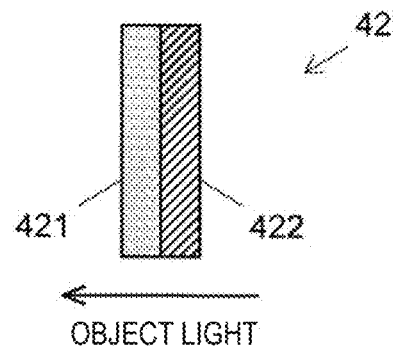
Figure 15C:
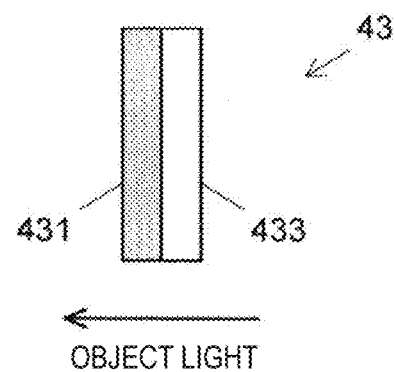
Figure 15D:
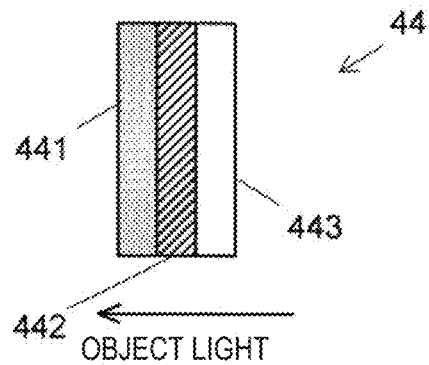
Figure 15E:
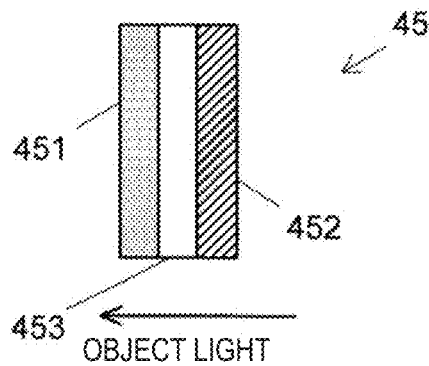
Figure 15F:
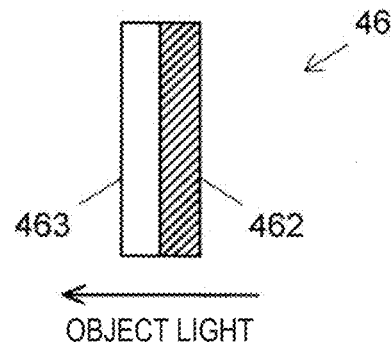
Figure 15G:
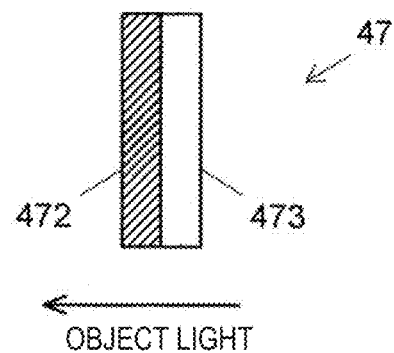
Figure 15H:
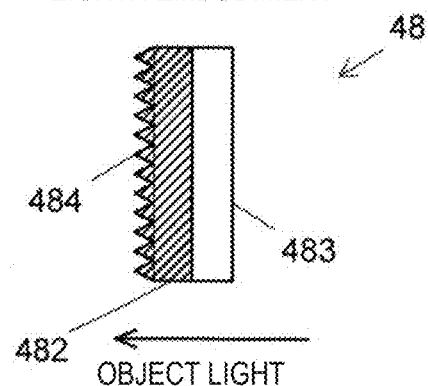

In the second example and the third example described above, the two-dimensional slits 113 and 213 in which the openings are disposed in a lattice pattern are used, but as shown in FIG. 14, a two-dimensional slit 323 in which sets of openings 3232 having different lengths and periods in the second axis direction are disposed side by side in the first axis direction of a base member 3231 can also be used. In the two-dimensional slits 113 and 213 in the second example and the third example, the length and period in the second axis direction are determined for one wavelength $\lambda$ included in the object light. When these two-dimensional slits 113 and 213 are used, the rays of light of the wavelength $\lambda$ mainly intensify each other in all the linear interference images obtained from the plurality of measurement points disposed in the first axis direction. On the other hand, in the two-dimensional slit 313 shown in FIG. 14, since the sets of the openings 3232 disposed side by side in the first axis direction are designed to individually intensify the rays of light of the k wavelengths $\lambda_n$ (n=1, 2, . . . ) included in the object light, it is possible to detect the interference image in which the interference degrees of the different wavelengths are increased in each of the linear interference images obtained from the plurality of measurement points disposed in the first axis direction.

When an interference image is obtained from only one measurement point on the surface of the sample S, a slit in which openings are one-dimensionally disposed only in the second axis direction may be used. In this case, a line detector in which a plurality of pixels are disposed only in the second axis direction can be used.

Furthermore, in the above example as the multi-slits 13 and 113 and the two-dimensional slits 213 and 313 used as the amplitude-type diffraction grating, those in which the openings 132, 1132, 2132, and 3132 are formed by etching a base member such as a single crystal of silicon are used, but the amplitude-type diffraction grating may have any configuration as long as translucent portions and the light-shielding portions are alternately arrayed one-dimensionally or two-dimensionally, and need not be provided with physically opened portions. For example, a multi-slit or a two-dimensional slit can be formed by applying, to a surface of a base member made of a material that transmits light in the wavelength band of the object light emitted from a measurement point on the surface of the sample, a mask made of a material that does not transmit light in the wavelength band of the object light and having openings arrayed one-dimensionally or two-dimensionally.

In the above example, a material including a single crystal of silicon having a surface on which gold is deposited is used, but a material on which metal other than gold (for example, aluminum) is deposited can also be used. Alternatively, a material made only of metal such as gold may be used. The material is not limited to pure metal, and it is also possible to use any kind of metal having free electrons such as stainless steel (SUS) is deposited or a material made of stainless steel or the like. In the above examples, by providing a subwavelength structure on a surface facing the two-dimensional detector 18, 118, or 218, the reflection by the multi-slit 13 or the two-dimensional slit 113 or 213 is suppressed, but other configurations can be adopted. For example, a surface of the slit 13 or the two-dimensional slit 113 or 213 facing the two-dimensional detector 18, 118, or 218 may be sandblasted to form a rough surface, or the surface may be given an inclination to reflect light in a direction different from the direction to the two-dimensional detector 18, 118, or 218. Alternatively, an appropriate anti-reflection film may be formed on the surface instead of the subwavelength structure. In the case of forming the antireflection film, it is preferable to use a material having an emissivity smaller than that of silicon or to adopt a configuration of cooling the amplitude-type diffraction grating on which the antireflection film is formed.

In the above examples, a thermal-type detector is used as the two-dimensional detector 18, 118, or 218, but a quantum-type two-dimensional detector may be used. As the quantum-type two-dimensional detector, for example, an MCT detector, an InSb-type detector, a CCD detector, or a CMOS detector can be used. Since these quantum-type detectors photoelectrically convert incident infrared rays to generate electric signals and detect the electric signals, it is unlikely that radiation light is generated from the detector. However, in the quantum type detector, it is necessary to use a cooling mechanism for suppressing generation of thermal noise, so that the device becomes expensive. Therefore, in order to suppress the cost of the device, it is preferable to use the two-dimensional detector 18, 118, or 218 that is a thermal-type detector, as in the above example.

(Embodiment of Amplitude-type Diffraction Grating)

Amplitude-type diffraction gratings 41 to 47 of seven embodiments that can be adopted in the spectrometry device according to the present invention will be described with reference to FIGS. 15A to 15H. The amplitude-type diffraction gratings described below may be a multi-slit (in which openings are disposed one-dimensionally) as used in the first example, or may be a two-dimensional slit (in which openings are disposed two-dimensionally) as used in the second example and the third example. Alternatively, as described above, an element formed by applying, to a surface of a base member made of a material that transmits light in the wavelength band of the object light, a mask made of a material that does not transmit light in the wavelength band of the object light and having openings one-dimensionally or two-dimensionally.

(1) First Embodiment

In the amplitude-type diffraction grating 41 of a first embodiment, a light-shielding member is constituted only by a member (absorbing member) 411 made of a material having an absorptivity larger than that of silicon in the wavelength band of the object light, and a plurality of openings are provided in the light-shielding member. As such a material, for example, quartz glass or various organic compounds can be used.

In the amplitude-type diffraction grating 41, since an absorbing member 411 made of a material having an absorptivity higher than that of silicon is used, it is possible to absorb (block) more object light emitted from the sample and entering the light-shielding portion of the amplitude-type diffraction grating 41 than in the conventional case of using a light-shielding member made of a single crystal of silicon, so that the definition of the interference image can be increased as compared with the conventional case. Even when radiation light is emitted from the photodetector, the radiation light is absorbed by the absorbing member 411. Therefore, the radiation light from the photodetector does not re-enter the photodetector, so that the definition of the interference light does not deteriorate.

In a case where the wavelength band of the object light is in the infrared region, the object light incident on the light-shielding portion can be absorbed sufficiently by using an absorbing member made from a quartz glass having a thickness of about 0.1 mm in general. Many of the above-described materials having high light absorptivity have high emissivity. However, when the material has a thickness of about 0.1 mm, the amount of radiation light is small, and thus the definition of the interference image is not greatly affected. However, in a case where the intensity of the object light is high, it is necessary to increase the thickness of the absorbing member 411 in order to absorb the object light incident on the light-shielding portion of the amplitude-type diffraction grating 41. In this case, the amount of radiation light emitted from the absorbing member 411 increases, and there is a possibility that the definition of the interference image is reduced. In such a case, it is preferable to adopt a configuration including a diffraction grating cooling unit configured to cool the amplitude-type diffraction grating 41. Alternatively, a photodetector configured to selectively cool only a pixel on which light passing through the light-shielding portion is incident among a plurality of pixels included in the photodetector may be used.

In the above example, the configuration for cooling the photodetector has been described, but it is not realistic to cool the photodetector to absolute zero. That is, even if the photodetector is cooled, some radiation light is emitted. In general, it is attempted to increase the definition of the interference image of the object light by reducing the amount of light incident on the pixels corresponding to the light-shielding portions of the amplitude-type diffraction grating 41 and increasing the difference from the amount of light incident on the pixels corresponding to the openings. However, in a case where the intensity of the object light is weak, it is also conceivable to reverse this relationship. That is, it is conceivable to increase the amount of light incident on the pixels corresponding to the light-shielding portions and increase the difference with the amount of light incident on the pixels corresponding to the openings by heating the amplitude-type diffraction grating 41 to cause it to actively emit the radiation light. Alternatively, it is possible to adopt a configuration including a temperature control mechanism configured to heat and/or cool the amplitude-type diffraction grating 41 and a temperature change unit configured to change a temperature to which the amplitude-type diffraction grating 41 is heated and/or cooled by the temperature control mechanism, in which the temperature of the amplitude-type diffraction grating 41 is controlled so that the definition of the interference image of the object light becomes the highest. In the following embodiments, only cooling of the amplitude-type diffraction grating will be individually described, but also in the following embodiments, similarly to this embodiment, it is possible to adopt a configuration in which a temperature control mechanism and a temperature change unit are appropriately provided and an amplitude-type diffraction grating can be heated.

(2) Second Embodiment

In the amplitude-type diffraction grating 42 of the second embodiment, a member (reflection member) 422 made of a material (for example, metal such as gold; the same applies to the following embodiments) having a reflectance higher than that of silicon in the wavelength band of the object light is disposed on a side of a light incident face on which the object light is incident, and an absorbing member 421 is disposed on a side of a light emission face from which the object light is emitted. In the amplitude-type diffraction grating 42, since most of the object light incident on the light-shielding portion of the amplitude-type diffraction grating 41 is reflected by the reflection member 422, it is not necessary to increase the thickness of the absorbing member 421 even when the intensity of the object light is large. In the amplitude-type diffraction grating 42, since the thin absorbing member 421 of about 0.1 mm can be used, the amount of radiation light emitted from the absorbing member 421 is sufficiently small, but the definition of interference light may be increased by further providing a diffraction grating cooling unit.

(3) Third Embodiment

The amplitude-type diffraction grating 43 of the third embodiment is obtained by combining an absorbing member 431 with a plate-like member (silicon member) 433 made of a single crystal of silicon. As described above, in many cases, the absorbing member 431 having a thickness of about 0.1 mm can absorb the object light incident on the light-shielding portion, but is easily damaged because of the low strength, and is difficult to handle. In the third embodiment, the absorbing member 431 can be reinforced to have sufficient strength in combination with the silicon member 433. Here, an example of a case where a silicon member used as a light-shielding member in a conventional amplitude-type diffraction grating is used as it is as a reinforcement member is illustrated, but a material and a shape of the reinforcement member can be appropriately changed. For example, a frame-shaped member or the like that reinforces the peripheral portion of the absorbing member 431 can also be used.

(4) Fourth Embodiment

The amplitude-type diffraction grating 44 of the fourth embodiment is a combination of the second embodiment and the third embodiment, in which a silicon member 443, a reflection member 442, and an absorbing member 441 are disposed in order from a side on which the object light is incident. In the amplitude-type diffraction grating 44, both of the effects obtained in the second embodiment and the third embodiment can be obtained.

(5) Fifth Embodiment

The amplitude-type diffraction grating 45 of the fifth embodiment is also a combination of the second embodiment and the third embodiment, in which a reflection member 452, a silicon member 453, and an absorbing member 451 are disposed in order from a side on which the object light is incident. Also in the amplitude-type diffraction grating 45, both of the effects obtained in the second embodiment and the third embodiment can be obtained.

(6) Sixth Embodiment

In the amplitude-type diffraction grating 46 of the sixth embodiment, a reflection member 462 is disposed on a side on which the object light is incident, and a silicon member 463 is disposed on a side from which the object light is emitted. In the amplitude-type diffraction grating 46, the object light is reflected at light-shielding portions of the reflection member 462 with a high reflectance, and the object light hardly reaches light-shielding portions of the silicon member 463. Therefore, the amplitude-type diffraction grating 46 can obtain an interference image having high definition as compared with the conventional amplitude-type diffraction grating formed only of the silicon member.

In the amplitude-type diffraction grating 46, the single crystal of silicon is exposed on the side of the face from which the object light is emitted. Since silicon is a material having high thermal radiation (high emissivity), more radiation light is emitted from the silicon member 463 as the temperature becomes higher. When this radiation light is incident on a photodetector, the definition of the interference image decreases. In addition, since silicon is a material having a high reflectance, when radiation light is emitted from the photodetector, there is a possibility that the radiation light is reflected by the amplitude-type diffraction grating 46 and enters the photodetector again. When this reflected light is incident on the photodetector, the definition of the interference image decreases. Therefore, when the amplitude-type diffraction grating 46 of this embodiment is used, it is preferable to adopt a configuration including a cooling unit configured to cool the amplitude-type diffraction grating 46 and/or the photodetector.

(7) Seventh Embodiment

In the amplitude-type diffraction grating 47 of the seventh embodiment, a silicon member 473 is disposed on a side on which the object light is incident, and a reflection member 472 is disposed on a side from which the object light is emitted. In the amplitude-type diffraction grating 47, even if the object light passes through light-shielding portions (portions other than openings) of the silicon member 473, the object light is reflected by light-shielding portions of the reflection member 472. Therefore, the amplitude-type diffraction grating 47 can obtain an interference image having high definition as compared with the conventional amplitude-type diffraction grating formed only of the silicon member.

In the amplitude-type diffraction grating 47, when light in the same wavelength band (infrared region) as the object light is radiated (thermally radiated) from the photodetector as in a thermal-type photodetector, there is a possibility that the light is directly reflected by the reflection member and is incident on the photodetector again. Therefore, when the amplitude-type diffraction grating 47 is used in combination with the thermal-type photodetector or the like, it is preferable to adopt a configuration in which the photodetector is cooled to suppress thermal radiation.

(8) Eighth Embodiment

In an amplitude-type diffraction grating 48 of the eighth embodiment, a silicon member 483 is disposed on a side on which the object light is incident, and a reflection member 482 is disposed on a side from which the object light is emitted, and an antireflection portion 484 is provided to a surface (light emission face) of the reflection member 482. The antireflection portion 484 only needs to suppress direct reflection of incident light, and various antireflection portions can be used. Specifically, for example, the light emission face side of the antireflection portion 484 is provided with the sub-wavelength structure (SWC) described in the above examples, the light emission face is sandblasted, or the light emission face is inclined, and thereby the antireflection portion 484 can be provided.

In the amplitude-type diffraction grating 48 of the eighth embodiment, even when radiation light is emitted from a photodetector, the antireflection portion 484 can prevent the radiation light from entering the photodetector again. In addition, since a metal such as gold, that is, a material having a small emissivity is located on the light emission face side, the thermal radiation from the amplitude-type diffraction grating 48 is also small. Therefore, it is possible to obtain an interference image with sufficiently high definition without cooling the amplitude-type diffraction grating 48 and the photodetector. Of course, it is also possible to further include a configuration for cooling the amplitude-type diffraction grating 48 and/or the photodetector and adopt a configuration by which the definition of the interference image of the object light is further increased.

REFERENCE SIGNS LIST

1 . . . . Spectrometry Device
11 . . . . Imaging Lens
13 . . . . Multi-slit
131, 131 . . . . Base Member
132, 132 . . . . Opening Portion
133 . . . . Convex Portion
14 . . . . Cooling Member
15 . . . . Objective Lens
16 . . . . Phase Shifter
16a . . . . Fixed Mirror Unit
16b . . . . Movable Mirror Unit
18 . . . . Two-dimensional Detector
181 . . . . Pixel
19 . . . . Cooling Member
25 . . . . Control/Processing Unit
100 . . . . Spectrometry Device
111 . . . . Imaging Lens
113 . . . . Multi-slit
1131 . . . . Base Member
1132 . . . . Opening Portion
1133 . . . . Convex Portion
114 . . . . Cooling Member
115 . . . . Objective Lens
117 . . . . Cylindrical Lens
116 . . . . Phase Shifter
116a . . . . First Transmission Portion
116b . . . . Second Transmission Portion
118 . . . . Two-dimensional Detector
119 . . . . Cooling Member
125 . . . . Control/Processing Unit
200 . . . . Spectrometry Device
211 . . . . Imaging Lens
213 . . . . Two-dimensional Slit
2131 . . . . Base Member
2132 . . . . Opening Portion
214 . . . . Cooling Member
215 . . . . Objective Lens
216 . . . . Phase Shifter
216a . . . . Reference Mirror
216b . . . . Inclined Mirror
218 . . . . Two-dimensional Detector
219 . . . . Cooling Member
225 . . . . Control/Processing Unit
313 . . . . Two-dimensional Slit
3131 . . . . Base Member
3132 . . . . Opening Portion
3133 . . . . Convex Portion
41 to 48 . . . . Amplitude-type Diffraction Grating
411, 421, 431, 441, 451 . . . . Absorbing Member
422, 432, 442, 452, 462, 472, 482 . . . . Reflection Member
443, 453, 463, 473, 483. Silicon Member
484 . . . . Antireflection Portion
S . . . Sample

The invention claimed is:

1. A spectrometry device comprising:
a collimating optical system configured to collimate object light emitted from a measurement point on a surface of a sample;
a photodetector having a light-receiving face in which a plurality of pixels are linearly arrayed;
a conjugate plane imaging optical system provided between the sample and the collimating optical system, the conjugate plane imaging optical system forming a plane optically conjugate with respect to a surface of the sample between the conjugate plane imaging optical system and the collimating optical system;
an amplitude-type diffraction grating disposed on the conjugate surface and having a light emission face from which the object light is emitted, the light emission face being formed by a light-shielding member which is made of a material having a radiation rate lower than that of silicon and/or is configured to suppress re-entering light coming from the photodetector into the photodetector in a wavelength band of the object light compared to silicon and which is provided with a plurality of openings;

an optical path length differentiating optical system configured to divide object light collimated by the collimating optical system into a first light beam and a second light beam and provide an optical path length difference between the first light beam and the second light beam; and an interference optical system configured to cause the first light beam and the second light beam provided with the optical path length difference by the optical path length differentiating optical system to interfere with each other to form an interference image on the light-receiving face.

2. The spectrometry device according to claim 1, wherein the light-shielding member includes a reflection member disposed on a side of a light incident face on which the object light is incident and made of a material having a reflectance higher than that of silicon in a wavelength band of the object light, and an absorbing member disposed on a side of the light emission face and made of a material having an absorptivity than that of silicon in a wavelength band of the object light.

3. The spectrometry device according to claim 1, further comprising a reinforcing member reinforcing the light-shielding member.

4. The spectrometry device according to claim 1 wherein the light emission face is made of a material having a reflectance higher than that of silicon in the wavelength band.

5. The spectrometry device according to claim 4, wherein the material having a higher reflectance than that of silicon is gold.

6. The spectrometry device according to claim 5, wherein the light emission face is subjected to antireflection processing.

7. The spectrometry device according to claim 6, wherein the antireflection processing is performed by disposing convex portions on the light emission face with a period equal to or less than the wavelength band of the object light.

8. The spectrometry device according to claim 1, further comprising a diffraction grating temperature control unit configured to heat or cool the amplitude-type diffraction grating.

9. The spectrometry device according to claim 1, further comprising a detector cooling unit configured to cool a light-receiving face of the photodetector.

10. The spectrometry device according to claim 1, wherein
the object light is mid-infrared light, and
the photodetector converts heat generated by thermally coupling incident mid-infrared rays and a sensor into electric signals and detects the electric signals.

* * * * *